UNITED STATES PATENT OFFICE.

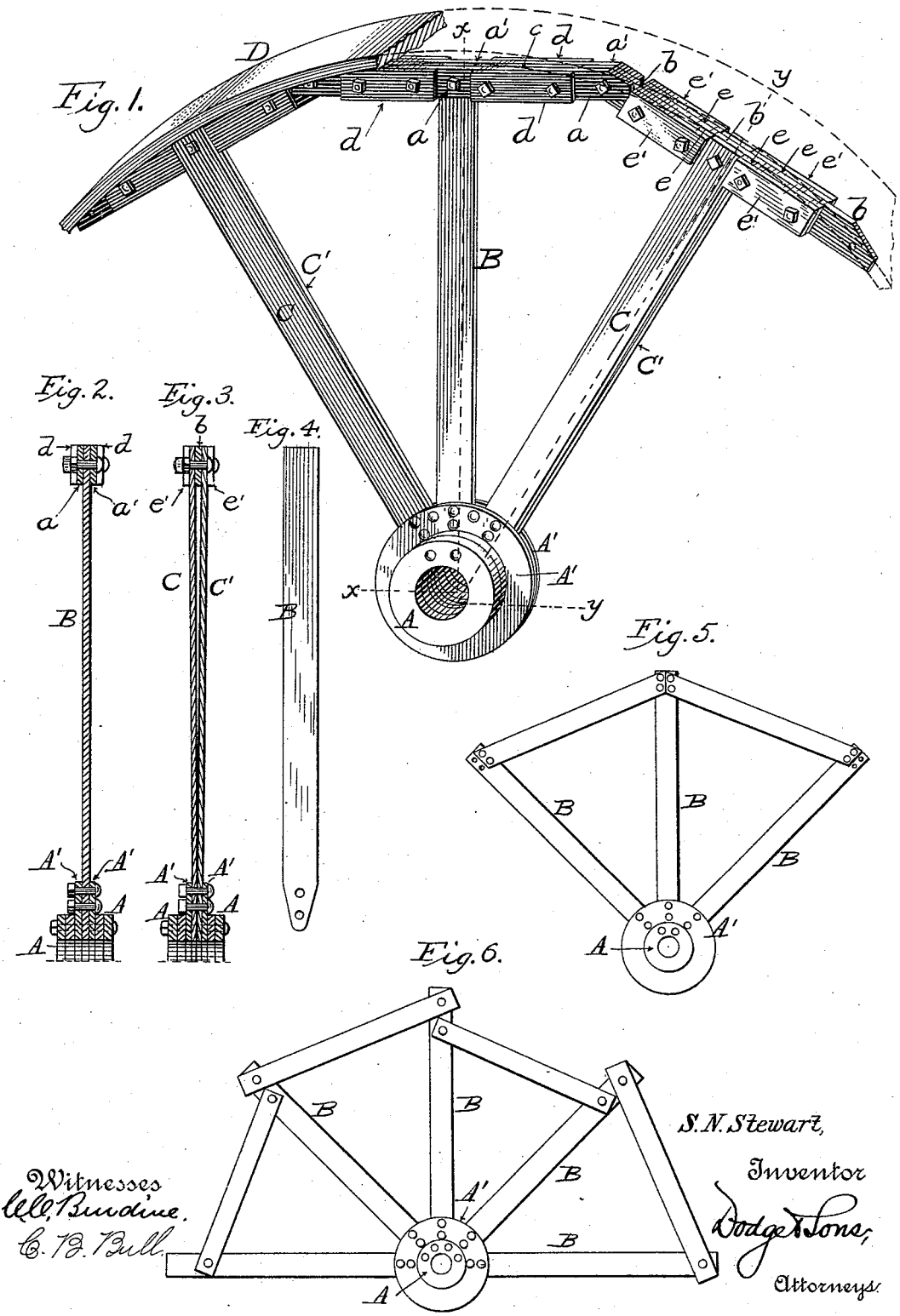

SYLVESTER N. STEWART, OF BROOKLYN, NEW YORK.

FLY-WHEEL.

SPECIFICATION forming part of Letters Patent No. 575,741, dated January 26, 1897.

Application filed March 6, 1894. Renewed July 10, 1896. Serial No. 598,731. (No model.)

*To all whom it may concern:*

Be it known that I, SYLVESTER N. STEWART a citizen of the United States, residing at Brooklyn, in the county of Kings and State of New York, have invented certain new and useful Improvements in Fly-Wheels, of which the following is a specification.

My invention relates to fly-wheels the construction and properties of which will be hereinafter more fully explained.

In the drawings, Figure 1 is a perspective view of a section of my improved wheel; Fig. 2, a sectional view on the line $x\,x$; Fig. 3, a sectional view on the line $y\,y$; Fig. 4, a face view of one of the spokes, and Figs. 5 and 6 views showing modified forms of construction.

Heretofore it has been customary to make fly-wheels in perfectly circular form of sections of cast-iron, or in one casting where the wheel is of small diameter. My invention differs from these constructions in that the sections or pieces of which the wheel is formed are of wrought iron or steel, and hence free from all concealed air-spaces, which render the cast wheels liable to fracture. It also differs from the old constructions in that the periphery or rim is not necessarily circular in form, but may be octagonal or any shape other than circular. The bars or sections of which the wheel is formed are arranged so that their edges form the rim, that is, they are placed so that their greatest thickness is at right angles to the axis of the wheel.

A designates the hub, which in this case is shown as formed of six plates, which may be circular, square, or of other form, securely bolted or riveted together, the larger and inner plates A' A' embracing the inner ends of the spokes of the wheel.

In the construction shown in Fig. 1 there are two series of spokes B and C C, the spokes B being single spokes and the others double spokes, the reason for which will presently be explained. The inner ends of all the spokes are preferably formed as shown in Fig. 4, that is, they are tapered, so that when they are assembled there is a space between their edges in the hub, through which space pass the bolts or rivets which serve to clamp the hub-plates. The spokes are secured to the hub by bolts passing through them and the plates A' A'.

To the outer end and upon both faces of the spoke B there are secured plates or rim-bars $a\,a'$, and between the ends of these plates there are embraced the plates $b$, these latter plates or rim-bars being in turn connected at the center of their length to the spokes C C', the spokes being on opposite sides of the plate. In a wheel in which spoke B is one inch thick spokes C C' should each be one-half inch thick. The parts are firmly and securely fastened in this position by bolts or rivets, as shown in the drawings.

To balance the wheel and to give it sufficient weight and body, there are bolted or otherwise secured between the plates $a\,a'$ two shorter plates $c\,c$, which extend from the edges of the spoke to the ends of the plates or bars $b$, while similar sections $d\,d$ are secured upon the outer faces of the plates $a\,a'$.

To the outer faces of the bar $b$, at each side of the spokes C C', are secured two short sections $e\,e'$, and when desired the outer layer may be one continuous plate, as shown in dotted lines in Fig. 1.

The spokes and the rim plates or bars are all made of steel or wrought-iron, and, being free from all concealed air-cavities and also having great tensile strength, they form, when properly and securely bolted or riveted together, a fly-wheel not liable to breakage from centrifugal action.

Owing to the superior tensile or cohesive strength of steel a fly-wheel constructed of that material will safely sustain a rim velocity of at least one hundred and sixty feet per second, while the safe limit of cast-iron is eighty feet per second. Hence the steel wheel can be given a diameter twice as great as can safely be given to a cast-iron wheel designed to make the same number of revolutions per minute, and, having that diameter which gives a rim velocity of one hundred and sixty feet per second, one pound in the rim of this wheel produces the same effect as four pounds in the rim of the other wheel. Twice the velocity multiplied by twice its leverage equals four times the effect. The power or effect of a fly-wheel is the product of weight multiplied by leverage multiplied by velocity. Two tons weight multiplied by ten feet radius multiplied by one hundred and sixty feet per second equals three thousand two hundred, and eight tons weight multiplied by five feet radius multiplied by eighty feet per second equals three thousand two hundred. Hence it follows that a two-ton wide-spread steel wheel is equal in effect to a thick-set cast-iron wheel weighing eight tons. This effects not only a saving in weight, but a saving in power, because in the two-ton wheel there is lost in journal friction only one-fourth as much power as is lost in the eight-ton wheel. Besides this great advantage over the old constructions they are cheaper and easier of being assembled.

When it is desired to use the wheel as a band-wheel, a circular band or tire D, Fig. 1, may be bolted, riveted, or shrunk upon the periphery of the wheel.

In Fig. 5 I have shown a construction wherein only single spokes are used, the rim bars or sections being fastened at each end to the spokes, as many thicknesses or layers of bars being used as is necessary to produce the requisite weight.

Fig. 6 shows a somewhat similar construction; but instead of beveling the ends of the bars, as in the former case, the alternate bars are made shorter and secured at a point below the ends of the spokes.

Various changes of construction and arrangement may be made, making the fly-wheel octagonal, hexagonal, square, triangular, or any shape so that the sections are made of the material and assembled in substantially the manner above set forth.

The wheel may be readily made heavier by simply adding more bars to increase the thickness of the rims.

I am aware that fly-wheels have been made up of two or more sections of cast-iron instead of being made of a single casting, and that wooden band-pulleys have had their rims made up of pieces of wood with their outer faces curved, and to these constructions I make no claim.

Having thus described my invention, what I claim is—

1. A fly-wheel comprising a hub, a series of spokes radiating therefrom, and a rim connected to the spokes, said rim composed of a series of straight, flat bars of wrought iron or steel.

2. A fly-wheel having its rim composed of a series of independent straight, flat bars of wrought iron or steel.

3. A fly-wheel having a rim composed of a series of straight, flat bars of wrought iron or steel, the greater diameter of thickness of said bars being in a plane at right angles to the axis of the wheel.

In witness whereof I hereunto set my hand in the presence of two witnesses.

SYLVESTER N. STEWART.

Witnesses:
   EDWD. E. CRAWFORD,
   E. B. STROUT.